Patented Dec. 5, 1950

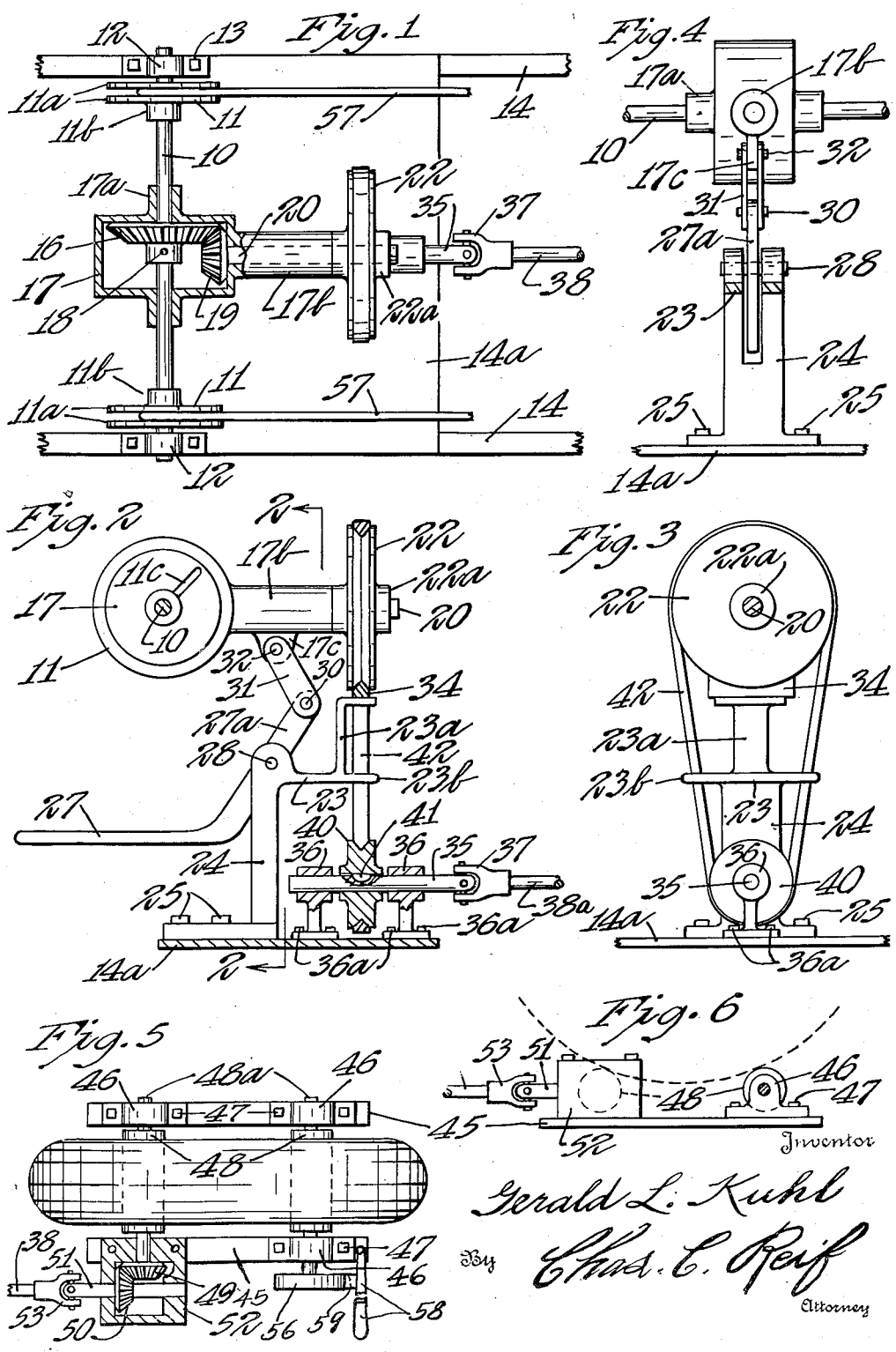

2,533,022

UNITED STATES PATENT OFFICE 2,533,022

VEHICLE TAKE-OFF

Gerald L. Kuhl, Chester, Minn.

Application April 4, 1947, Serial No. 739,465

14 Claims. (Cl. 74—13)

This invention relates to a control device for governing the operation of a driven means. While the invention could have many applications, it has been particularly designed for use in operating a lifting device or hoist comprising a cable which is wound on a rotating member. While the mechanism and hoist could just as well be stationary, the mechanism is illustrated as mounted on a truck.

It is an object of this invention to provide a mechanism comprising a driven member, a driving shaft, and means controlled by the operator for quickly operatively connecting said driven member to said driving shaft and for quickly stopping the operation of said driven member.

It is a further object of the invention to provide a driven member, a pulley operatively connected to said member, means connected to said driven member tending to move said pulley downwardly about a substantially horizontal axis, a driving pulley below said pulley, a belt preferably of the V-shaped type connecting said pulleys together, with means actuated by the operator for raising said first mentioned pulley to tighten said belt and drive said first mentioned member.

It is a further object of the invention to provide such a device as set forth in the preceding paragraph, together with means engaged by said first mentioned pulley when it is moved downwardly and said belt slackened for stopping the rotation of said first mentioned pulley.

It is more specifically an object of the invention to provide a control mechanism including a driven shaft, a second shaft operatively connected to said shaft and extending at an angle thereto, a pulley connected to said second shaft, means connected to said first mentioned shaft acting to move said pulley downwardly about the axis of said first mentioned shaft, a driving pulley below said first mentioned pulley, a belt passing over and connecting said pulleys, said belt being slackened when said first mentioned pulley is moved downwardly so as to be in non-driving position, and means actuated by the operator for elevating said first mentioned pulley, tightening said belt and driving said first mentioned shaft.

It is also an object of the invention to provide such a mechanism as set forth in the preceding paragraph, together with a segment of friction material preferably in stationary position disposed beneath said first mentioned pulley and adapted to engage the same when it is moved downwardly for braking and stopping the rotation of said first mentioned pulley.

It is still another object of the invention to provide a novel and efficient means for actuating the driving shaft which is connected to the above mentioned second pulley.

These and other objects and advantages of the invention will be fully set forth in the following description made in connection with the accompanying drawings in which like reference characters refer to similar parts throughout the several views and in which:

Fig. 1 is a plan view of the invention, a portion thereof being shown in horizontal section;

Fig. 2 is a view partly in side elevation and partly in vertical section;

Fig. 3 is a view in end elevation as seen from the right of Fig. 1;

Fig. 4 is a vertical section taken substantially on line 4—4 of Fig. 2, as indicated by the arrows;

Fig. 5 is a plan view of a driving means used; and

Fig. 6 is a view in side elevation of the parts shown in Fig. 5.

Referring to the drawings a mechanism is shown comprising a driven shaft 10 which will usually be in substantially horizontal position. Shaft 10 has secured to the ends thereof drums 11 comprising spaced disks 11a, said drums having hubs 11b secured to shaft 10. One of said disks 11a, preferably the outer one, will have a slot 11c extending radially therein for some distance from hub 11b. While shaft 10 could be variously mounted, in the embodiment of the invention illustrated it is shown as mounted in bearings 12 secured by suitable bolts or screws 13 to the side members 14 of an automobile such as a truck. Members 14 could also rest on the ground. A beveled gear 16 is secured to shaft 10, the hub of which at its rear side engages one side of a gear casing 17 having extending hub portions 17a journaled on shaft 10. Gear 16 can be secured in any suitable manner, as by a pin 18. A beveled pinion 19 meshes with gear 16 and is secured to a shaft 20 journaled in an elongated sleeve 17b forming part of gear casing 17. A pulley 22 is secured to shaft 20, the same having a hub 22a abutting the outer end of sleeve 17b. While pulley 22 could be variously formed, in the embodiment of the invention illustrated it is shown and the same is preferably made with a peripheral groove of substantially V-shape in radial cross section. A stationary member 23 is provided which will be suitably supported on one or more brackets 24, which in turn will be supported from frame members 14 and connected thereto in any suitable manner, as by the bolts 25. A pedal 27 is provided having an arm 27a extending upwardly therefrom and oscillatably mounted on a pivot member 28 mounted in member 23. The upper end of arm 27a is pivotally connected by a pivot member 30 to a link 31 which at its other end is disposed between spaced lugs 17c on the bottom of sleeve 17b and pivotally connected thereto by a stud 32. It will be seen that arms 27a and 31 thus form a toggle which when the same is moved toward straightened position by pedal 27 will elevate sleeve 17b and pulley 22. An arm 23a extends upwardly from member 23 and then substantially at right angles to a position below pulley 22. A member 34 of segmental form is secured to arm 23a and has a V-shaped upper surface adapted to fit in the peripheral groove of pulley 22 and to engage said pulley when the same is moved downwardly. A driving shaft 35 is provided, the same being shown as journaled in spaced brackets 36 secured in any suitable manner to a cross member 14a which is secured to the frame members 14, as by bolts or screws 36a. Shaft 35 can be variously driven, as from the motor of the automobile or it can be driven from a separate driving means as will be later described. A universal joint 37 is shown connected to shaft 35, the same being connected to a driving shaft 38a. A second pulley 40 is provided, the same being secured in any suitable manner to shaft 35, as by the key 41. Pulley 40 is preferably of the type having a peripheral groove substantially of V-shape in radial cross section and the same is alined with pulley 22. A belt 42, preferably of the V-shaped type, passes around pulleys 22 and 40. A loop 23b extends from the lower portion of arm 23a around belt 42 and has its ends disposed in close proximity to said belt.

A driving means for shaft 35 is illustrated in Figs. 5 and 6. This comprises spaced members or rails 45 having bearings 46 secured thereto in any suitable manner, as by bolts 47. Spaced rollers 48 have trunnions 48a journaled in bearings 46. One of said trunnions 48a is extended and has secured thereto a beveled pinion 49. Pinion 49 meshes wih a beveled gear 50 secured to a shaft 51 journaled in the spaced hubs of a gear casing 52, which casing encloses gears 49 and 50. Shaft 51 has connected thereto a universal joint 53 in turn connected to a shaft 38a.

A cable 57 will be connected to each of the drums 11. The end of this cable can conveniently be passed between disks 11a and the end thereof turned into the slot 11c. When the drums are revolved, the cable will be gripped and will wind about the hub of the drum between disks 11a. These cables 57 run over a pulley at the top of a boom (not shown) and will be suitably connected to the object to be lifted, as is common in such well known hoists. The load places an upward tension on the cables 57 and this tends to rotate shaft 10 which through gears 16 and 19 tends to move shaft 20 downward about the axis of shaft 10. This action moves pulley 22 downwardly toward pulley 40 and slackens the belt 42 so that it is in non-driving or inoperative position. When pulley 22 is thus moved downwardly the periphery thereof moves forcibly into engagement with segment 34 which has its face made of friction material and said segment thus acts as a brake instantly stopping the rotation of pulley 22. Shaft 35 will be driven as described and this will drive pulley 40. As just stated, when pulley 22 is lowered, belt 42 will not drive pulley 22. When pulley 22 is lowered, as described, belt 22 drops downwardly and the sides thereof are moved somewhat together by the loop 23b which causes the portion of the belt below said loop to bulge and to loosely engage and move slightly away from pulley 40. This further prevents any rotation of pulley 22. When the operator wishes to lift the load he presses on pedal 27. This moves arm 27a and straightens the toggle formed thereby and by link 31 thus elevating sleeve 17b and pulley 22, both of which move about the axis of shaft 10. Gear case 17 thus swings about shaft 10. This elevation of pulley 22 instantly tightens belt 42 and pulley 22 is driven, thus driving shaft 20, and through gears 19 and 16, driving shaft 10 and the drums 11, so that cables 57 are wound on the drums and the load or desired object is lifted. As soon as it is desired to stop the lifting operation, the operator moves his foot from pedal 27 and the action of the cables 57, as described, now swings sleeve 17b and pulley 22 downwardly. This movement is assisted by the weight of pulley 22 and sleeve 17b. Pulley 22 now comes forcibly into engagement with segment 34 and its rotation is at once stopped and the hoisting operation is thus stopped. The operator thus has a fine and instant control over the hoisting operation.

In some cases of loading and unloading materials such as hay, manure and other material about a farm or other establishment, the driving mechanism shown in Figs. 5 and 6 is used. The mechanism shown in Figs. 5 and 6 will be suitably located for the loading or unloading operation. The operator will drive the truck in position so that one driven wheel thereof will ride up on the rollers 48. Shaft 38 will be coupled to shaft 38a. The rotation of the driven wheel will drive rollers 48 and this will drive gears 49 and 50, shaft 51 and shaft 38. Power is thus applied to the driving shaft 35 through shaft 38a and coupling 37 and the operator can control the loading and unloading operation by means of pedal 27, as already described. In this operation the device shown in Figs. 1 to 4 is disposed so that shafts 38 and 38a do not vary much in their distance from the ground.

From the above description it will be seen that I have provided a simple, efficient and very practical control device for operating a mechanism such as a hoist. The operator has instant control over the hoisting operation and no time is lost in raising and lowering the hoist. Speed is desired in many loading and unloading operations and the present mechanism is designed not only for an instant and accurate control but also for a control which can be operated very quickly to secure the raising and lowering of the hoist. The mechanism is simple and rugged. The mechanism can be easily applied to various kinds of trucks which carry a hoist. Such trucks are now used in large numbers on farms and by garages. The device has been amply demonstrated in actual practice and found to be very successful and efficient.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A control mechanism for a driven member having in combination, a shaft to be driven, a second shaft operatively connected to said shaft for simultaneous rotation therewith a pulley operatively connected to said first mentioned shaft and movable about the axis of said second shaft, means connected to said second shaft normally tending to move said pulley downwardly about said axis, a second pulley below said first mentioned pulley, a belt connecting said pulleys, a driving shaft for rotating said second pulley, and means adapted to be actuated by the operator for moving said first mentioned pulley upward about said axis to tighten said belt and drive said first mentioned pulley and first mentioned shaft.

2. The structure set forth in claim 1, said first mentioned pulley having a groove in its periphery of angular shape in radial cross section, and a stationary segment of friction material beneath said first mentioned pulley shaped to fit in said groove thereof and to engage and stop rotation of said first mentioned pulley when the same is moved downwardly by said first mentioned means.

3. A control mechanism for a driven member having in combination, a shaft to be driven, a pulley operatively connected to said shaft and movable about a substantially horizontal axis, means connected to said shaft normally tending to rotate the same and to move said pulley downwardly about said axis, a second pulley below said first mentioned pulley, a belt connecting said pulleys, a driving shaft for rotating said second pulley, a stationary member, a mechanism connected to said stationary member and having the same as a base of reaction for moving said first mentioned pulley upward about said axis, and a pedal for actuating said mechanism to move said first mentioned pulley upward, tighten said belt and drive said first mentioned shaft.

4. A control mechanism for a driven member having in combination, a shaft to be driven, a pulley operatively connected to said shaft and movable bodily about a substantially horizontal axis, means connected to said shaft normally tending to rotate said shaft and to move said pulley downwardly about said axis, a second pulley below said first mentioned pulley, a belt connecting said pulleys, a driving shaft for rotating said second pulley, a stationary member, a toggle link having one end connected to said member and the other end operatively connected to said first mentioned pulley, and a pedal for straightening said toggle and raising said first mentioned pulley to tighten said belt and drive said first mentioned pulley and first mentioned shaft.

5. A control mechanism for a driven member having on combination, a shaft to be driven, a second shaft extending at an angle to and geared to said shaft, a pulley secured to said second shaft, means connected to said first mentioned shaft tending to move said pulley and second shaft downwardly about the axis of said first mentioned shaft, a second pulley below said first mentioned pulley, a belt connecting said pulleys, a driving shaft for rotating said second pulley, and means actuated by the operator for elevating said first mentioned pulley to tighten said belt and drive said first mentioned pulley and first mentioned shaft.

6. The structure set forth in claim 5, and means comprising a segment of friction material beneath said first mentioned pulley and engaged thereby when said pulley is moved downwardly for stopping the rotation of the same.

7. A control mechanism for a hoist having in combination, a shaft, means for winding a cable driven by said shaft, a second shaft extending at an angle to said shaft, meshing gears respectively secured to and connecting said shafts, a gear casing enclosing said gears oscillatable on said first mentioned shaft and forming a bearing for said second shaft, a pulley secured to said first mentioned shaft, a second pulley below said pulley, a belt connecting said pulleys, means for driving said second pulley, and means actuated by the operator for swinging said first mentioned pulley and gear casing upwardly about the axis of said first mentioned shaft to tighten said belt and drive said first mentioned pulley.

8. A hoist driving and control mechanism comprising a shaft adapted to be driven for pulling upon a hoist cable, a second shaft geared to said shaft, a pulley carried by said second shaft, said pulley and second shaft being swingable about the axis of said first mentioned shaft, said cable tending to swing said pulley downward about said axis, a second pulley below said first mentioned pulley mounted on a third shaft, a belt connecting said pulleys, means actuated by the operator for swinging said first mentioned pulley upwardly about said axis to tighten said belt, and means operable by a driven wheel of a vehicle for driving said third shaft.

9. The structure set forth in claim 8, said last mentioned means comprising spaced rollers on which said driven wheel is supported, said rollers being frictionally rotated by said wheel and means connecting one of said rollers and third shaft.

10. The structure set forth in claim 8, said last mentioned means comprising spaced rollers on which said driven wheel is supported, said rollers being frictionally rotated by said wheel, means connecting one of said rollers and third shaft, and means for stopping rotation of one of said rollers so that said driven wheel can run off of said rollers.

11. The structure set forth in claim 1, said first mentioned pulley having a V-shaped groove in its periphery and an arcuate member of friction material disposed below said first mentioned pulley into engagement with which said first mentioned pulley is forced by said first mentioned means when said second mentioned means is inoperative.

12. A hoist driving and control mechanism comprising a shaft adapted to be driven for pulling upon a hoist cable, a pulley carried by said shaft and swingable about an axis spaced from and at right angles to its axis, said cable tending to rotate said shaft and to swing said pulley downward about said axis, a second pulley below said first mentioned pulley, a belt connecting said pulleys, means actuated by the operator for swinging said first mentioned pulley upwardly about said first mentioned axis to tighten said belt, a third shaft for driving said second pulley, and means operable by a driven wheel of a vehicle for driving said third shaft.

13. A control mechanism for a driven member having in combination, a shaft to be driven for driving a hoist, a cable connected to said shaft for raising the load lifted by said hoist, a pulley connected to said shaft and bodily movable about a substantially horizontal axis spaced therefrom, said cable being arranged to move said pulley downwardly about said axis, a second pulley below said first mentioned pulley, a belt connecting said pulleys, a driving shaft for rotating said second pulley, and means adapted to be actuated by the operator for moving said first mentioned pulley upward about said axis to tighten said belt and drive said first mentioned pulley and first mentioned shaft to exert pull on said cable and lift the load.

14. A control mechanism for a driven member having in combination, a shaft to be driven, a second shaft rotatably connected to said shaft to be driven thereby, a pulley operatively connected to said first mentioned shaft and oscillatable about the axis of said second shaft, means connected to said second shaft normally tending to move said pulley downwardly against said axis, a second pulley below said first mentioned pulley, a belt connecting said pulleys, a driving shaft for rotating said second pulley, means adapted to be actuated by the operator for moving said first mentioned pulley upward about said axis to tighten said belt and drive said first mentioned pulley and first mentioned shaft, and means engaged by said first mentioned pulley when swung downwardly about said axis for braking and stopping the rotation of the same and said first mentioned shaft.

GERALD L. KUHL.

REFERENCES CITED

The following references are of record in the file of this patent:

UNITED STATES PATENTS

| Number | Name | Date |
|---|---|---|
| 273,627 | Somers | Mar. 6, 1883 |
| 1,006,529 | Brown | Oct. 24, 1911 |
| 1,136,246 | Levin | Apr. 20, 1915 |
| 1,180,109 | Curry | Apr. 18, 1916 |
| 1,356,423 | Beer | Oct. 19, 1920 |
| 1,422,218 | Maimin | July 11, 1922 |
| 2,104,837 | Hunt | Jan. 11, 1938 |